United States Patent
Innis et al.

(10) Patent No.: US 7,457,892 B2
(45) Date of Patent: Nov. 25, 2008

(54) DATA COMMUNICATION FLOW CONTROL DEVICE AND METHODS THEREOF

(75) Inventors: James E. Innis, Cedar Park, TX (US); Iftekhar Ahmed, Mawson Lakes (AU); Matthew Joseph Taylor, Blair Athol (AU); David W. Todd, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 79 days.

(21) Appl. No.: 11/446,891

(22) Filed: Jun. 5, 2006

(65) Prior Publication Data

US 2008/0005405 A1  Jan. 3, 2008

(51) Int. Cl.
*G06F 3/00* (2006.01)
(52) U.S. Cl. .............. 710/29; 710/5; 710/52; 710/57; 709/232; 709/233
(58) Field of Classification Search ............ None
See application file for complete search history.

(56) References Cited

U.S. PATENT DOCUMENTS

| | | | |
|---|---|---|---|
| 6,084,856 A * | 7/2000 | Simmons et al. ............ 370/235 |
| 6,112,267 A * | 8/2000 | McCormack et al. ........ 710/52 |
| 6,252,849 B1 | 6/2001 | Rom et al. |
| 6,405,258 B1 | 6/2002 | Erimli et al. |
| 6,724,725 B1 * | 4/2004 | Dreyer et al. ............... 370/231 |
| 7,065,582 B1 * | 6/2006 | Dwork et al. ............... 709/234 |
| 7,089,380 B1 * | 8/2006 | Schober ..................... 711/156 |
| 7,283,471 B2 * | 10/2007 | Gutierrez et al. ........... 370/230 |
| 2005/0105469 A1 | 5/2005 | Hao |

OTHER PUBLICATIONS

International Search Report and Written Opinion dated Nov. 23, 2007.

* cited by examiner

*Primary Examiner*—Eron J Sorrell (57) ABSTRACT

A device for controlling data communication flow to a data buffer of an integrated circuit is disclosed. The device receives data communicated from a transmitting device. The received data is placed in a data buffer in memory. The data buffer is defined by a set of buffer descriptors, whereby a number of free buffer descriptors in the set of buffer descriptors is indicative of the amount of free space in the data buffer. A communications controller determines whether the data buffer is subject to overflowing by determining when the number of free buffer descriptors moves below a threshold level (a watermark). The communications controller sends a request to the transmitting device to stop transmitting data in response to determining that the data buffer is possibly subject to an overflow condition, indicating that the data buffer is nearly full.

21 Claims, 3 Drawing Sheets

DATA COMMUNICATION FLOW CONTROL DEVICE AND METHODS THEREOF

FIELD OF THE DISCLOSURE

The present disclosure relates generally to data communications and more particularly to flow control of data communications.

BACKGROUND

Devices in a communications system, such as a computer network, can receive large amounts of data. It is common for a receiving device in a communication system to not have visibility with respect to how much information is to be received from one or more transmitting devices. For example, in an Ethernet network a receiving device may not have visibility at the Physical and Data Link layer as to how large a packet being received will be, let alone how large a next packet will be, thereby leading to a possibility of data overflow and loss of transmitted data at the receiving device. Requiring immediate processing of the received data by a data processing resource to alleviate the possibility of an overflow would typically place an undesirable burden on the central processing unit (CPU) or other processing module of the device. Similarly, requiring a memory FIFO at the Data Link layer to be sufficiently large to guarantee not losing transmitted data before it can be offloaded to an application can be costly, when possible. Therefore, a small memory FIFO can be used to quickly store a small amount of received data temporarily prior to sending the received data to a data buffer.

In some situations, however, it is possible that data can be received more rapidly than applications can remove and process the data from the data buffer. This can lead to overflow of the data buffer and an undesirable loss of received data. While the likelihood of data buffer overflow can be reduced by using a large receive queue or data buffer, the size and cost of such memory is undesirable for many communication systems. Accordingly, an improved device for controlling data communication flow would be advantageous.

DETAILED DESCRIPTION

A device for controlling data communication flow to a data buffer of an integrated circuit is disclosed. In one embodiment, the device receives data communicated from a transmitting device. The received data is placed in a data buffer in memory. The data buffer is defined by a set of buffer descriptors, whereby a number of free buffer descriptors in the set of buffer descriptors is indicative of the amount of free space in the data buffer. The device includes a communications controller that receives information from the transmitting device and has access to information indicative of the number of free buffer descriptors for the data buffer. The communications controller determines whether the data buffer is subject to overflowing by determining when the number of free buffer descriptors moves below a threshold level (a watermark). The communications controller sends a request to the transmitting device to stop transmitting data in response to determining that the data buffer is possibly subject to an overflow condition, indicating that the data buffer is nearly full. By stopping the flow of received data as the data buffer nears its capacity, the communications controller reduces the likelihood of data being lost at the receiving device.

Figure 1:
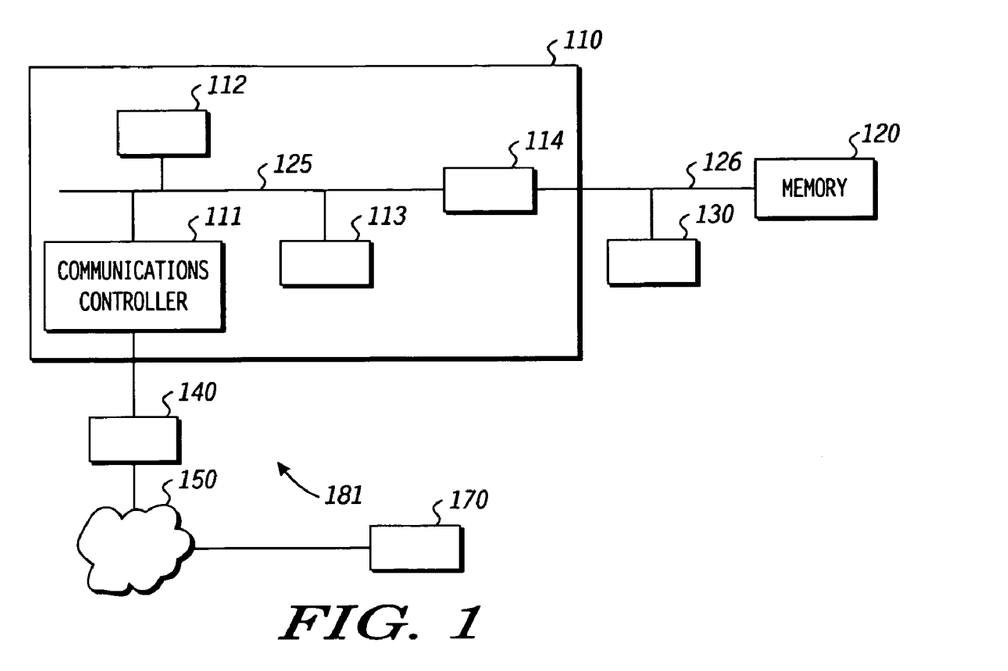
FIG. 1 is a block diagram of a particular embodiment of a communication system.

Referring to FIG. 1, a block diagram of a communications system 100 is illustrated. The communication system 100 includes a transmitting device 170, a receiving device 181, and a network 150. The network 150 may be a local area network, a wide area network, or other appropriate communication network, or combination thereof.

During operation, the transmitting device 170 transmits data to the receiving device 181 via the network 150. The receiving device 181 stores the received data in a data buffer at the memory 120. The data buffer is defined by a set of buffer descriptors Accordingly, each free buffer descriptor in the set of buffer descriptors identifies a portion of the data buffer that does not yet contain any data, and is considered free. A buffer descriptor associated with a portion of the data buffer containing received data is considered not free. When all data in an occupied portion of the data buffer associated with a buffer descriptor is removed, or otherwise used to completion, the associated buffer descriptor is considered serviced (i.e. freed), and once again is considered a free buffer descriptor. Accordingly, a portion of the data buffer in memory associated with the freed buffer descriptor is now available to receive more data.

The receiving device 181 keeps track of the number of free buffer descriptors in the buffer descriptor set. If, as data is written to the data buffer, the number falls below a watermark (threshold) level, indicating a potential overflow of the data buffer, the receiving device 181 issues a request to the transmitting device 170 to stop transmitting data. The stop request may be an Ethernet pause frame or other appropriate pause request. By stopping the transmitting device from transmitting the data for a period of time, the receiving device 181 is given time to free up a number of buffer descriptors, thereby reducing the likelihood of a buffer overflow.

The watermark level maintained by receiving device 181 may be set to account for any communication delay between the transmitting device 170 and the receiving device 181 that can result in an overflow of the data buffer. For example, there may be a delay between when the stop request is issued at the receiving device and the transmitting device is able to stop transmitting data. Accordingly, data will continue to be received for a period of time after the stop request has been issued. The watermark level can be selected so that there are enough free buffer descriptors to assure the associated data buffer can accommodate data received between the time when the stop request is issued and the transmitting device is able to stop transmission of data. For example, the watermark level may be based on a maximum frame size of the received data and a maximum delay needed to stop transmission of data.

The receiving device 181 in the embodiment of FIG. 1 is illustrated to include an integrated circuit device 110 connected to memory 120, device 130, and device 140. Device 140 represents a physical communications module 140 connected to network 150 to provide an interface between the communications controller 110 and the network 150. The device 130 can be a master/slave device, such as a CPU, memory controller, or other peripheral device. The memory 120 can include a read/write random access memory. In one embodiment, memory 120 is a system memory used to store one or more instructions for a CPU of the system 100, video information, and the like. The physical communications module 140 provides an interface between the communications controller 110 and the network 150. The physical communications module 140 can implement an Ethernet PHY layer or other appropriate physical communications functions. It will be appreciated that although the memory 120, the device 130, and the physical communications module 140 have been illustrated as external to the integrated circuit 110, one or more of these modules can also be integrated with the integrated circuit 110. It will further be appreciated that the communications system may be implemented without a physical communications module 140.

The integrated circuit 110 includes a communications controller 111 connected to the physical communication module 140 and to system bus 125. In a particular embodiment the communications controller is a link-layer controller, such as an Ethernet media access controller (MAC), or other standard-based or propriety link-layer controller. The integrated circuit device 110 also includes devices 112, 113, and 114, connected to bus 125. Devices 112-114 can be master or slave devices, and in a particular embodiment, the device 113 is a CPU, and the device 114 can be a bus interface unit between the bus and the bus 126.

During operation, the physical communications module 140 receives signals from the transmitting device 170 and performs appropriate processing to provide data to the communications module 111. In a particular embodiment, the communications controller 111 places the received data in a first-in first-out (FIFO) memory queue (memory FIFO) (not shown) at the communications controller 111. Data in the FIFO memory is transferred to the data buffer, which can be stored in the memory 120.

Data stored at the data buffer is typically removed from the data buffer in a first-in first out (FIFO) manner by the accessing application, thereby freeing the portion of the data buffer where the data was stored. For example, the accessing application may process packetized information stored in the data buffer and transform the packetized data to an appropriate format for access by other applications. Note that the application accessing the data in the data buffer can be a hardware or software based application.

In a particular embodiment, the data buffer is defined by a set of buffer descriptors. For example, a set of buffer descriptors can form a buffer descriptor ring, where each of the buffer descriptors is associated with a portion of the of the data buffer stored in the memory 120. For example, each buffer descriptor can contain a pointer to a memory location in the memory 120 associated with the data buffer portion. As data is written to a portion of the data buffer, the buffer descriptor associated with the data buffer portion is identified as used or no longer free. Once data stored at a specific buffer descriptor location in the data buffer is processed, and thereby moved out of the data buffer, the buffer descriptor is freed and identified as free. Accordingly the number of free buffer descriptors is indicative of the amount of free space in the data buffer available to the communications controller 111.

The communications controller 111 monitors the number of free buffer descriptors in the buffer descriptor set. Information relating to the number of free buffers can be provided by a data processing resource that manages the buffer descriptors defining the system memory. Such a resource can be a hardware or software resource such as a user application, driver, and the like. The resource can be external to the integrated device 110, such as at the master/slave device 130. For example, the resource that updates information relating to the availability of buffer descriptors in the set of buffer descriptors can also provide the availability information to the integrated circuit device, or other location, accessible by communications controller 111. The information may be provided via the system bus 125. In conventional systems information relating to the freeing of buffer descriptors is not provided to a link-level controller such as the communications controller 111 and assessment of such freeing by the link level controller can consume an undesirable amount of time and system resources. In addition, information related to the buffer descriptors that are used or not free can be calculated at the communications controller 111. Note that, in accordance with the present disclosure, the resource that updates information at the integrated circuit device relating to the availability of buffer descriptors need not update the information in real time. Accordingly, in a particular embodiment there may be more free or less free space in the buffer than is indicated by the free buffer descriptor information. The watermark can be set to account for when the availability of the buffer descriptors is updated.

The communications controller 111 has access to a watermark indicating a desired number of free buffer descriptors. A potential overflow of the data buffer is indicated if the number of free buffer descriptors associated with the data buffer falls below or is equal to a value based on the watermark. Accordingly, in response to the potential overflow condition, the communications controller 111 issues a stop request to the transmitting device 170, thereby stopping the transmission of data.

A stop request can temporarily delay transmission of data, such as with an Ethernet pause command, or terminate transmission of data from a transmitting device. Therefore, in a particular embodiment, after a sufficient number of buffer descriptors have been freed, the communications controller can notify the transmitting device 170 that transmission of data can resume. In a particular embodiment, the communications controller can provide a control signal to indicate to the transmitting device whether data should be transmitted. By setting a state of the control signal, the communications controller can control transmission of data.

In an alternative embodiment, the communications controller 111 issues a series of pause requests to the transmitting device 170. Each pause request stops transmission of data for a pause interval. After a sufficient number of buffer descriptors have been freed, the communications controller 111 stops issuing pause requests, and after the pending pause interval has passed the transmitting device 170 resumes transmission of data.

Figure 2:
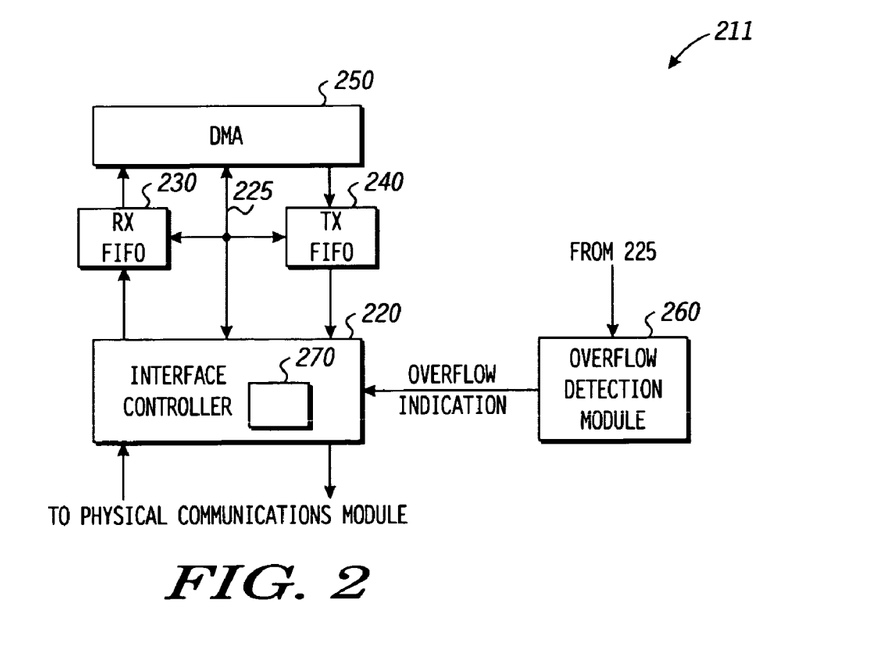
FIG. 2 is a block diagram of a particular embodiment of a communications controller of the communications system.

Referring to FIG. 2, a block diagram of a particular embodiment of a communications controller 211 is illustrated. The communications controller 211 is a specific embodiment of the communications controller 111 of FIG. 1. The communications controller 211 includes an interface controller 220, a receive FIFO 230, a transmit FIFO 240, a DMA (direct memory access) controller 250, and an overflow detection module 260. In a particular embodiment, the receive FIFO 230 is an SRAM receive FIFO. The interface controller 220 includes an output and an input to be connected to a physical communications module. The receive FIFO includes an input connected to an output of the interface controller 220, and an output connected to an input of DMA controller 250. The receive FIFO includes an output connected to an input of the interface controller 220, and an input connected to an output of DMA controller 250. The overflow detection module 260 has an output connected to an input of the interface controller 220. Control signals between modules are provided over one or more connections represented by connection 225. Note that overflow detection module 260 can also be connected to connection 225 to receive information related to overflow detection.

During operation, the interface controller 220 receives data from and provides data to the physical communications module 140. The received data is stored in the receive FIFO 230 and transferred to a data buffer via the DMA module 250. The overflow detection module 260 monitors the number of free buffer descriptors defining the data buffer as an indication of the data buffer fullness to determine if there is a potential overflow condition. The overflow detection module can also monitor other system resources to determine if a real or potential overflow exists. For example, the overflow detection module 260 can monitor a fullness of the receive FIFO 230 to determine if there is a potential overflow condition at the receive FIFO 230. In the event of a potential overflow condition, the overflow detection module 260 asserts the OVERFLOW INDICATOR signal. In response, the flow control module 270 sends a request to a transmitting device to stop transmission of data, thus reducing the likelihood of an overflow in the data buffer or receive FIFO 230.

The transmit FIFO 240 receives data to be accessed by the interface controller 220. The interface controller 220 provides data from the transmit FIFO to the physical interface module.

Figure 3:
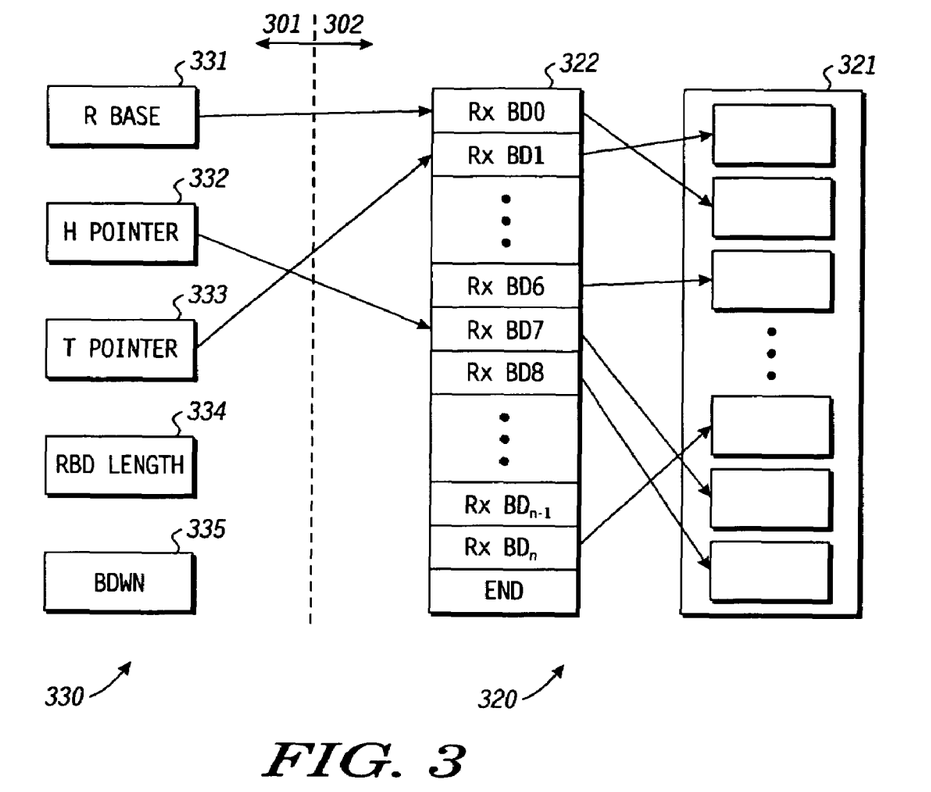
FIG. 3 is a diagram illustrating the relationship of various memory elements of a communications system in accordance with a particular embodiment of the present disclosure.

Referring to FIG. 3, a diagram of a particular embodiment of a scheme of organizing a data buffer is illustrated. The diagram illustrates a set of registers 330. The set of registers 330 stores address and other information associated with a set of buffer descriptors 322. The set of buffer descriptors 322 represents a buffer descriptor ring defining data buffer 321. The set of buffer descriptors 322 and the data buffer 321 can reside stored in a memory 320, such as the memory 120 of FIG. 1. The set of registers 330 may be located at the an integrated circuit device, and can specifically reside within communications controller 111.

As illustrated, the set of buffer descriptors 322 includes a number of buffer descriptors. Each buffer descriptor includes a pointer to an address of memory 320 identifying a portion of memory 320 associated with data buffer 321. The pointer included in each buffer descriptor can be initialized during system initialization or other appropriate time. It will be appreciated that the buffer descriptor need not point to physically sequential portions of the memory 320.

The set of registers 330 includes a base register 331, a head pointer register 332, a tail pointer register 333, a ring length register 334, and a watermark register 335. The base register 331 stores a value (RBASE) indicative of the memory address for the first buffer descriptor in the buffer descriptor set 322. The head pointer register 332 stores a value (HPOINTER) indicative of the memory address for the buffer descriptor associated with the next available portion of the data buffer 321 that is updated by the communications controller 111 as data is stored at new buffer descriptor locations.

In a particular embodiment, the set of buffer descriptors 322 is configured as a buffer descriptor ring that wraps around as data is written. The value of HPOINTER is initially set by the resource managing the buffer descriptor ring to the value of RBASE, so that HPOINTER indicates that data is to be stored at the first buffer descriptor of the buffer descriptor ring.

The tail pointer register 333 stores a value (TPOINTER) indicative of buffer descriptor associated with the most recently serviced or freed up portion of the data buffer 321. Thus, as the processing application moves data out of the data buffer 321, i.e. de-allocates memory, the value of TPOINTER is updated by the resource managing the ring buffer to identify the buffer descriptor associated with the latest portion of the data buffer 321 to be serviced. If the set of buffer descriptors 322 are configured as a buffer descriptor ring, the TPOINTER moves in a ring fashion and points to the "tail" of the buffer descriptor ring.

It will be appreciated that the number of free buffer descriptors can be determined based on the location of the head and the tail of the buffer descriptor ring. The number of free buffer descriptors provides a measure of the fullness of the data buffer 321 available to the communications controller 111. In a particular embodiment, the number of free buffer descriptors can be calculated according to the formula:

$$FREEBD = TPOINTER - HPOINTER + RBDLENGTH$$

when TPOINTER is less than HPOINTER and according to the formula $$FREEBD = TPOINTER - HPOINTER$$

when TPOINTER is greater than or equal to HPOINTER. The value RBDLENGTH is indicative of the length of the buffer descriptor ring, and is stored in register 334 of register set 330. In a particular embodiment, HPOINTER, TPOINTER, and RBDLENGTH represent index values for the buffer descriptors.

The watermark register 335 stores a value PBDWM that indicates a desired minimum number of free buffer descriptors in the set of buffer descriptors 322. If the number of free buffer descriptors in the set of buffer descriptors 322 is less than this desired number, there is a potential for overflow in the data buffer 321. Accordingly, the PBDWM value can be compared to the number of free buffer descriptors in the set of buffer descriptors 322 to identify a potential overflow of the data buffer 321.

Figure 4:
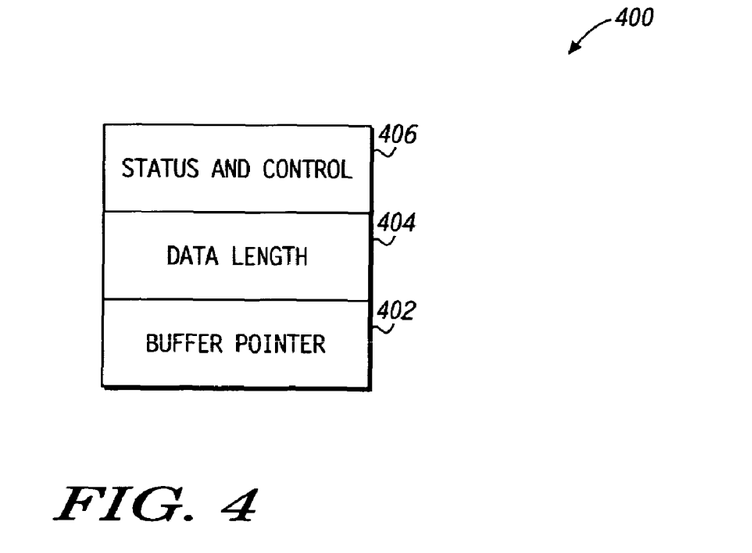
FIG. 4 is a diagram of a particular embodiment of a buffer descriptor associated with the data buffer.

Referring to FIG. 4, a diagram of a particular embodiment of a buffer descriptor 400 is illustrated. The buffer descriptor 400 includes an address pointer field 402, a data length field 404, and a status and control field 406. The address pointer field 402 that identifies the base address of a portion of a data buffer, such as the data buffer 321, associated with the buffer descriptor 400. The data length field 404 stores a value indicative of the amount of data stored in the portion of the data buffer associated with the buffer descriptor 400. The data length field can be used by the resource managing access to the data buffer corresponding to the buffer descriptor to identify how much of the data buffer is associated with a specific buffer descriptor. The status and control field 406 stores status and control information, such as head and tail information within the system memory, whether a buffer is free, and whether the buffer descriptor 400 is the last buffer descriptor in a buffer descriptor ring.

Figure 5:
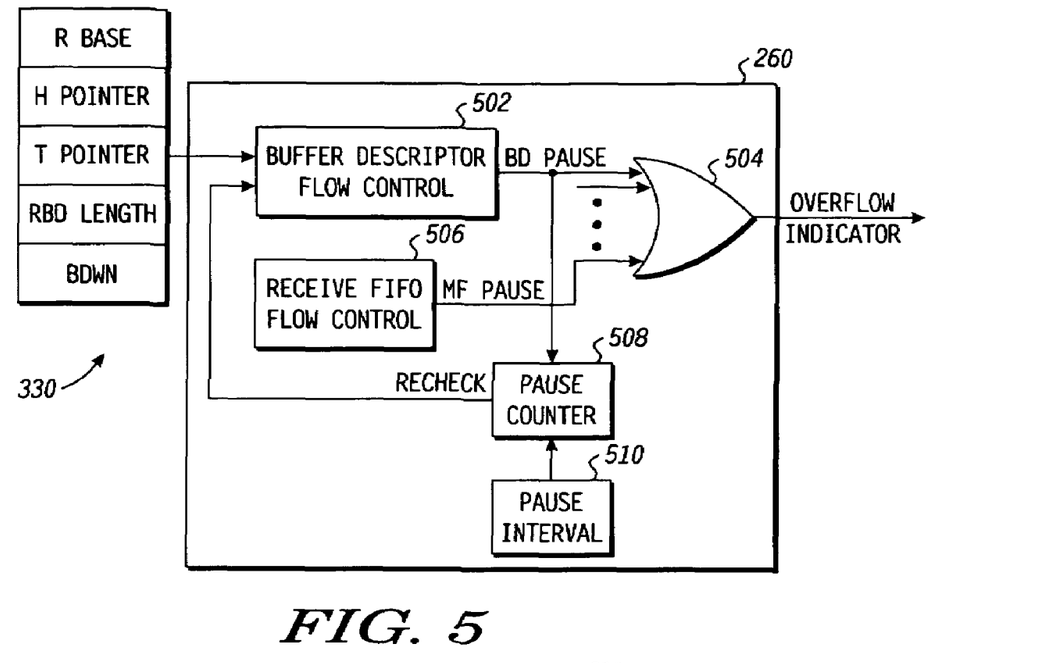
FIG. 5 is a block diagram a particular embodiment of an overflow detection module of the communications controller.

Referring to FIG. 5, a block diagram of a particular embodiment of the overflow detection module 260 is illustrated. The overflow detection module 260 is connected to the set of registers 330. The overflow detection module 260 includes a buffer descriptor flow control module 502, a receive FIFO flow control module 506, a pause counter 508, a pause interval register 510, and an OR gate 504. The buffer descriptor flow control module includes a first input connected to the set of registers 330, a second input to receive a signal RECHECK, and an output to provide a signal BDPAUSE to indicated a possible overflow condition at the data buffer. The receive FIFO flow control module 506 has an output to provide a signal MFPAUSE to indicated a possible overflow condition at the receive FIFO. The pause counter 508 includes an output connected to the buffer descriptor flow control module to provide the signal RECHECK, a first input to receive the signal BDPAUSE, and a second input. The pause interval register 510 includes an output connected to the second input of the pause counter 508. The OR gate 504 has a number of inputs, including an input connected to the output of the buffer descriptor flow control module 502 and an input connected to the output of the receive FIFO flow control module 506, and an output to provide a signal OVERFLOW INDICATOR.

During operation, the buffer descriptor flow control module 502 accesses the set of registers 330 to determine if there is a potential overflow in the data buffer. In a particular embodiment, the buffer descriptor flow control module 502 detects a potential overflow by determining the number of free buffer descriptors associated with the data buffer and comparing that number to the watermark value PBDWM as described with respect to FIG. 3. If the buffer descriptor flow control module 502 detects a potential overflow, the signal BDPAUSE is asserted, resulting in assertion of the OVERFLOW INDICATOR signal. In response to assertion of this signal, the communications controller 111 will issue a stop request to the transmitting device, thereby reducing the likelihood of an overflow in the data buffer.

The receive FIFO flow control module 506 detects potential overflow in the receive FIFO 230. If a potential overflow is detected, the signal MFPAUSE is asserted, resulting in assertion of the signal OVERFLOW INDICATOR and issuance of the pause request. Accordingly, the overflow detection module 260 is able to detect potential overflows in multiple locations, including the receive FIFO 230 and the data buffer, thereby reducing the likelihood of data loss.

The pause counter 508 can be used to keep a value based on the length of time that data transmission has been stopped, allowing the overflow detection module 260 to maintain the overflow indicator until a potential overflow is no longer present, or remove the overflow indicator after predetermined amount of time. In one embodiment where an Ethernet protocol is being implemented, the BDPAUSE signal will cause the pause counter to be set to a value based on the pause interval transmitted with a pause command. The pause interval value is the value PAUSE INTERVAL value stored in register 510, and is indicative of the length of time a pause command will cause data transmission to be stopped after the stop request has been issued by the communications controller 111. The pause counter 508 counts down from the PAUSE INTERVAL value until a threshold is reached. In a particular embodiment, the threshold value is half of the PAUSE INTERVAL value. When the threshold value is reached, the RECHECK signal is asserted, and the buffer descriptor flow control module rechecks the values stored in the register bank 330 to determine if there is still a potential overflow in the data buffer. If there is still a potential overflow, the signal BDPAUSE is again asserted, causing another stop request to be sent to the transmitting device.

Figure 6:
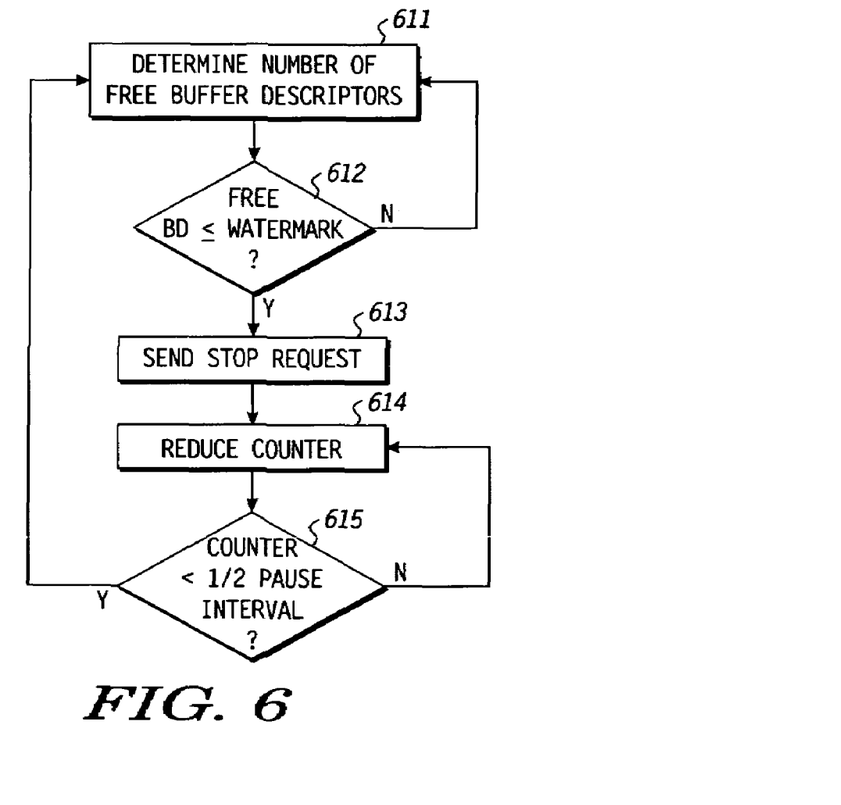
FIG. 6 is a flow diagram of a particular embodiment of a method of managing data communication flow at an integrated circuit device.

Referring to FIG. 6, a flow diagram of a particular embodiment of a method of controlling data flow to a data buffer is illustrated. The method can be implemented at a communications controller, such as the communications controller 111 of FIG. 1. At block 611, a number of free buffer descriptors associated with the data buffer are determined. The number of free buffer descriptors is indicative of the amount of free space in the data buffer available to a communications controller or similar device, and thus indicate the potential for a data overflow. At decision block 612, it is determined whether the number of free buffer descriptors is less than or equal to a watermark value. The watermark value is indicative of a desired number of free buffer descriptors to avoid or reduce the likelihood of an overflow in the data buffer. If the number of free buffer descriptors is greater than the watermark value, the method flow returns to block 611. If the number of free buffer descriptors is less than or equal to the watermark value the method flow moves to block 613 and a request that stops transmission of data is sent to a data transmitting device. This allows the system to clear sufficient space in the data buffer to reduce the likelihood of an overflow.

The method flow moves to block 614 and a value stored in a counter is reduced. The counter represents the amount of time that data transmission will be stopped. At decision block 615, it is determined whether the counter has reached a threshold value. If not, the method flow returns to block 614 and the counter continues to be reduced until the threshold is reached. Once the threshold is reached the method flow returns to block 611 to determine if there is still a potential overflow in the data buffer. In this way, the method continues to issue stop requests until enough space in the data buffer has been cleared to reduce the likelihood of an overflow.

The disclosure has been described with reference to specific embodiments. However, it will be appreciated that various modifications and changes can be made without departing from the scope of the present disclosure as set forth in the claims below. For example, the communications system described herein could be implemented to receive packets of a fixed, rather than varying size. Further, the communications controller described herein could have access to multiple data buffers with associated buffer descriptor sets. Each buffer descriptor set can be associated with a different watermark. Thus, each data buffer could be associated with a different quality of service, with the quality of service depending at least in part on the associated watermark. Further, the information associated with the buffer descriptor set, such as the pointers to the head and tail of the buffer descriptor ring, can be stored at the communications controller, elsewhere in the integrated circuit, or external to the integrated circuit. Accordingly, the specification and figures are to be regarded in an illustrative rather than a restrictive sense, and all such modifications are intended to be included within the scope of the present disclosure.

A method for managing data flow has been disclosed. In a particular embodiment, the method includes receiving at an integrated circuit device at a first time a first value indicative of a first buffer descriptor in a buffer descriptor set comprising a plurality of buffer descriptors defining a memory buffer, wherein the first buffer descriptor is a free buffer descriptor, and determining that data being received at the integrated circuit device from a transmitting device is to stop based on the first value. In a particular aspect, the method includes receiving a second value at the integrated circuit device indicative of a buffer descriptor in the buffer descriptor set no longer being free, receiving a watermark value at the integrated circuit device indicative of a desired number of free buffer descriptors in the buffer descriptor set, and determining that data being received at the integrated circuit device from a transmitting device is to stop further based on the first value, the second value, and the watermark value.

In another particular aspect, the method includes receiving a length value at the integrated circuit device indicative of a total number of the buffer descriptor set, and determining that data being received at the integrated circuit device from a transmitting device is to stop further based on the length value. In yet another particular aspect, the buffer descriptor set is arranged as a buffer descriptor ring. In still another particular aspect, determining that data being received at the integrated circuit device from a transmitting device is to stop is based upon a relationship between the first value and the second value being less than the watermark value.

In a particular aspect, the method includes providing a stop indicator identifying a duration during which data being received at the integrated circuit device is to be stopped, and during the duration determining that data reception of data from the transmitting device should continue to be stopped. In another particular aspect, the first value is received from a data processing resource retrieving information from the memory buffer, and the second value is calculated at the integrated circuit device in response to providing information to the memory buffer. In a particular aspect, the data processing resource is external the integrated circuit device.

In a particular embodiment, the method includes receiving an Ethernet packet at a physical interface, providing information associated with the Ethernet packet to a receive FIFO queue at a link-layer module of an integrated circuit device, sending the packet information from the FIFO queue to a memory buffer, receiving a first tail indicator value indicative of a first free buffer descriptor of a first plurality of buffer descriptors defining a buffer descriptor ring, wherein the buffer descriptor ring defines the memory buffer, and sending a first pause command based on the first tail indicator value, wherein the first pause command is to stop a flow of data received at the physical interface of the integrated circuit device for a period of time.

In a particular aspect, the method includes receiving a head indicator value indicative of a next available buffer descriptor in the plurality of buffer descriptors and receiving a watermark value. In a particular aspect, sending the first stop command is further based on the head indicator value and the watermark value. In another particular aspect, sending the first stop command is based on a relationship between the head indicator value and the tail indicator value being less than the watermark value.

In another particular aspect, the method includes receiving a length value representative of a number of buffer descriptors in the plurality of buffer descriptors, and sending the first stop command is further based on the length value. In still another particular aspect, the method includes receiving a buffer descriptor base value representative of a base address of the buffer descriptor ring, and sending the first stop command is further based on the buffer descriptor base value.

In yet another particular aspect, the method includes receiving a second tail indicator value indicative of most recently freed buffer descriptor in a second plurality of buffer descriptors and sending a second stop command based on the first tail indicator value, wherein the second pause command is to restrict the flow of data received at the physical interface of the integrated circuit device.

A device for controlling data flow is disclosed. In a particular embodiment, the device includes a system bus at an integrated circuit device and a communications controller at the integrated circuit device coupled to the system bus. In a particular aspect the communications controller includes a watermark register to store a watermark value, wherein the watermark value indicates a minimum number of desired free buffer descriptors of a buffer descriptor set for a memory buffer, an overflow detection module comprising a first input coupled to the watermark register and an output to provide an asserted signal based on the watermark value to indicate a potential overflow of the memory buffer, and an interface module comprising an input coupled to the output of the overflow detection module and an output to transmit a request to a transmitting device when the signal at the overflow detection module indicates the potential overflow, the request to stop transmitting information to the interface module.

In another particular aspect, the communications controller further includes a head register to store a first pointer to a first buffer descriptor of the buffer descriptor set, a tail register to store a second pointer to a second buffer descriptor of the buffer descriptor set, and the overflow detection module further includes a second input coupled to the head register, a third input coupled to the tail register, wherein the asserted signal is further based on the first pointer and the second pointer. In yet another particular aspect, the communications controller further includes a ring length register to store a ring length value indicative of the total number of buffer descriptors of the buffer descriptor set, and the asserted signal is further based on the ring length value. In a particular aspect, the first pointer is calculated at the integrated circuit device and the integrated circuit device includes an input to receive the second pointer from a device external the integrated circuit device. In still another particular aspect, sending the first stop command is based on a relationship between the head indicator value and the tail indicator value being less than the watermark value.

In another particular aspect, the communications controller further includes a pause length register to store a pause length value indicative of a pause interval during which the transmitting device stops transmitting information in response to the request. In still another particular aspect, the communications controller further includes a counter comprising an input coupled to the pause length register and an output to provide an asserted reissue signal, and the overflow detection module further includes a fourth input coupled to the output of the counter, and wherein the asserted signal is further based on the reissue signal.

In yet another particular aspect, the interface module comprises an Ethernet media access controller. In still another particular aspect, the device includes a receive memory FIFO queue at the integrated circuit device, the receive memory FIFO queue associated with the communications controller, the receive memory FIFO queue having an output to provide an asserted FIFO overflow signal to the overflow detection module based on a fullness of the memory FIFO queue to indicate a potential overflow of the memory FIFO queue.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the present disclosure is not intended to be limited to the specific form set forth herein, but on the contrary, it is intended to cover such alternatives, modifications, and equivalents, as can be reasonably included within the spirit and scope of the disclosure.

What is claimed is:

1. A method, comprising:
    receiving at a first time a first value indicative of a first buffer descriptor in a buffer descriptor set comprising a plurality of buffer descriptors defining a memory buffer, wherein the first buffer descriptor is a free buffer descriptor;
    in response to determining that data being received from a transmitting device is to stop based on the first value:;

providing a first stop indicator identifying a first duration during which data being received at an integrated circuit device is to be stopped; and in response to determining prior to the end of the first duration that data reception should continue to be stopped, providing second stop indicator identifying a second duration during which data being received at an integrated circuit device is to be stopped.

2. The method of claim 1, further comprising:
receiving a second value indicative of a buffer descriptor in the buffer descriptor set no longer being free;
receiving a watermark value indicative of a desired number of free buffer descriptors in the buffer descriptor set; and
determining that data being received at an integrated circuit device from a transmitting device is to stop further based on the first value, the second value, and the watermark value.

3. The method of claim 2, wherein determining that data being received at the integrated circuit device from a transmitting device is to stop is based upon a relationship between the first value and the second value being less than the watermark value.

4. The method of claim 2, wherein the first value is received from a data processing resource retrieving information from the memory buffer, and the second value is calculated at the integrated circuit device in response to providing information to the memory buffer.

5. The method of claim 4, wherein the data processing resource is external the integrated circuit device.

6. The method of claim 2, further comprising:
receiving a length value at the integrated circuit device indicative of a total number of the buffer descriptor set; and
determining that data being received at the integrated circuit device from a transmitting device is to stop further based on the length value.

7. The method of claim 1, wherein the received data is associated with an Ethernet protocol.

8. The method of claim 1, wherein sending the second pause command comprises sending the second pause command at the end of a second time duration, the second time duration approximately half of the first time duration.

9. A method, comprising:
receiving a data packet at a physical interface;
providing information associated with the data packet to a receive FIFO queue at a link-layer module of an integrated circuit device;
sending the packet information from the FIFO queue to a memory buffer;
receiving a first tail indicator value indicative of a first free buffer descriptor of a first plurality of buffer descriptors defining a buffer descriptor ring, wherein the buffer descriptor ring defines the memory buffer;
sending a first pause command based on the first tail indicator value, wherein the first pause command is to stop a flow of data received at the physical interface for a first period of time;
receiving a second tail indicator value indicative of a second free buffer descriptor of the first plurality of buffer descriptors; and
sending a second pause command prior to the end of the first period of time based on the second tail indicator value.

10. The method of claim 9, further comprising:
receiving a head indicator value indicative of a next available buffer descriptor in the plurality of buffer descriptors;
receiving a watermark value; and
wherein sending the first stop command is further based on the head indicator value and the watermark value.

11. The method of claim 10, wherein sending the first stop command is based on a relationship between the head indicator value and the tail indicator value being less than the watermark value.

12. The method of claim 10, further comprising:
receiving a length value representative of a number of buffer descriptors in the plurality of buffer descriptors; and
wherein sending the first stop command is further based on the length value.

13. The method of claim 9, further comprising:
receiving a second tail indicator value indicative of most recently freed buffer descriptor in a second plurality of buffer descriptors;
sending a second stop command based on the first tail indicator value, wherein the second pause command is to restrict the flow of data received at the physical interface.

14. A communications controller comprising:
a watermark register to store a watermark value, wherein the watermark value indicates a minimum number of desired free buffer descriptors of a buffer descriptor set for a memory buffer;
an overflow detection module comprising a first input coupled to the watermark register and an output to provide an asserted signal based on the watermark value to indicate a potential overflow of the memory buffer; and
an interface module comprising an input coupled to the output of the overflow detection module and an output to:
transmit a first request to a transmitting device when the signal at the overflow detection module indicates the potential overflow, the first request to stop transmitting information to the interface module for a first time period; and
transmit a second request to the transmitting device prior to the end of the first time period when the signal at the overflow detection module indicates the potential overflow, the second request to stop transmitting information to the interface module.

15. The communications controller of claim 14, further comprising:
a head register to store a first pointer to a first buffer descriptor of the buffer descriptor set;
a tail register to store a second pointer to a second buffer descriptor of the buffer descriptor set; and
the overflow detection module further comprising a second input coupled to the head register, a third input coupled to the tail register, wherein the asserted signal is further based on the first pointer and the second pointer.

16. The communications controller of claim 15, wherein the asserted signal is based on a relationship between the first pointer and the second pointer being less than the watermark value.

17. The device of claim 15, wherein the first pointer is calculated at an integrated circuit device and the integrated circuit device comprises an input to receive the second pointer from a device external the integrated circuit device.

18. The communications controller of claim 15, wherein the communications controller further comprises a ring length register to store a ring length value indicative of the total number of buffer descriptors of the buffer descriptor set, and wherein the asserted signal is further based on the ring length value.

19. The communications controller of claim 15, wherein the communications controller further comprises a pause length register to store a pause length value indicative of a pause interval during which the transmitting device stops transmitting information in response to the request.

20. The communications controller of claim 19, wherein the communications controller further comprises:
   a counter comprising an input coupled to the pause length register and an output to provide an asserted reissue signal; and
   the overflow detection module further comprising a fourth input coupled to the output of the counter, and wherein the asserted signal is further based on the asserted reissue signal.

21. The communications controller of claim 14, further comprising a receive memory FIFO queue, the receive memory FIFO queue associated with the communications controller, the receive memory FIFO queue comprising an output to provide an asserted FIFO overflow signal to the overflow detection module based on a fullness of the receive memory FIFO queue to indicate a potential overflow of the receive memory FIFO queue.

* * * * *